United States Patent [19]
Garde

[11] Patent Number: 6,002,882
[45] Date of Patent: *Dec. 14, 1999

[54] BIDIRECTIONAL COMMUNICATION PORT FOR DIGITAL SIGNAL PROCESSOR

[75] Inventor: Douglas Garde, Dover, Mass.

[73] Assignee: Analog Devices, Inc., Norwood, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/962,741

[22] Filed: Nov. 3, 1997

[51] Int. Cl.⁶ .............................. G06F 13/42; G06F 13/38
[52] U.S. Cl. ........................ 395/800.35; 712/35; 712/34; 709/237; 709/235
[58] Field of Search ............................ 395/800.38, 884, 395/200.36, 200.62, 200.59, 200.65, 865, 182.02, 200.52, 200.37, 200.57, 200.61, 200.67, 280, 800.37; 371/33; 370/321, 439, 443, 304, 427; 364/DIG. 1, DIG. 2; 712/18; 710/57; 709/215.232, 237, 235; 375/371

[56] References Cited

U.S. PATENT DOCUMENTS

| | | | |
|---|---|---|---|
| H1291 | 2/1994 | Hinton et al. | 395/800.23 |
| 4,164,787 | 8/1979 | Aranguren | 364/200 |

(List continued on next page.)

FOREIGN PATENT DOCUMENTS

| | | |
|---|---|---|
| 0570143 | 11/1993 | European Pat. Off. . |
| 0589499 | 3/1994 | European Pat. Off. . |
| WO 90/07154 | 6/1990 | WIPO . |

OTHER PUBLICATIONS

J.E. Brewer et al, "A Monolithic Processing Subsystem", IEEE Trans. On Components, Pack. & Manuf. Tech., Part B, vol. 17, No. 3, pp. 310–316, Aug. 1994.

J.E. Brewer er al, "A Single–Chip Digital Signal Processing Subsystem", 1994 Proceedings, Sixth Annual IEEE (ICWSI), San Francisco, CA, pp. 265–272, Jan. 1994.

T. Counihan et al, "On–chip Integrated Memories in DSP Architectures", Electronik, Jun. 14, 1994, Germany, vol. 43, No. 12, pp. 98–102, 104, 106.

IBM Technical Disclosure Bulletin, vol. 33, No. 10A, Mar. 1991, New York, pp. 1–5 Distributed Process Bulletin Board.

"MVP: The dawn of a new era in digital signal processing—Introducing TM5320C8X", Texas Instruments notes, date unknown.

(List continued on next page.)

*Primary Examiner*—Daniel H. Pan
*Attorney, Agent, or Firm*—Wolf, Greenfield & Sacks, P.C.

[57] ABSTRACT

A high performance digital signal processor includes a bidirectional communication port for communication with an external device. The bidirectional communication port includes a first transmitting circuit for transmitting to the external device a first clock on a first control line in a transmit mode and for transmitting data words on plural data lines in synchronism with the first clock, and a first receiving circuit for receiving a first acknowledge signal on a second control line in the transmit mode. The communication port further includes a second receiving circuit for receiving a second clock on the second control line in a receive mode and for receiving data words on the data lines in synchronism with the second clock, and a second transmitting circuit for transmitting a second acknowledge signal on the first control line in the receive mode. The communication port further includes switching means for switching between the transmit mode and the receive mode.

37 Claims, 12 Drawing Sheets

U.S. PATENT DOCUMENTS

| | | | |
|---|---|---|---|
| 4,439,839 | 3/1984 | Kneib et al. | 364/900 |
| 4,550,402 | 10/1985 | Gable . | |
| 4,574,345 | 3/1986 | Konesky | 364/200 |
| 4,641,238 | 2/1987 | Kneib | 364/200 |
| 4,754,394 | 6/1988 | Brantley, Jr. et al. | 364/200 |
| 4,800,524 | 1/1989 | Roesgen | 364/900 |
| 4,809,217 | 2/1989 | Floro et al. | 364/900 |
| 4,908,748 | 3/1990 | Pathak et al. | 364/200 |
| 5,010,476 | 4/1991 | Davis | 364/200 |
| 5,056,000 | 10/1991 | Chang | 364/200 |
| 5,099,417 | 3/1992 | Magar et al. | 395/425 |
| 5,151,979 | 9/1992 | Poskitt | 395/325 |
| 5,187,795 | 2/1993 | Balmforth et al. | 395/800.38 |
| 5,274,789 | 12/1993 | Costa et al. | 395/425 |
| 5,280,532 | 1/1994 | Shenoi et al. | 370/118 |
| 5,317,572 | 5/1994 | Satoh | 370/405.1 |
| 5,325,489 | 6/1994 | Mitsuhira et al. | 395/275 |
| 5,361,370 | 11/1994 | Sprague et al. | 395/800 |
| 5,390,304 | 2/1995 | Leach et al. | 395/375 |
| 5,404,522 | 4/1995 | Carmon et al. | 395/650 |
| 5,423,010 | 6/1995 | Mizukami | 395/375 |
| 5,438,666 | 8/1995 | Craft et al. | 395/842 |
| 5,471,607 | 11/1995 | Garde et al. | 395/550 |
| 5,497,362 | 3/1996 | Aizawa | 369/53 |
| 5,537,576 | 7/1996 | Perets et al. | 395/477 |
| 5,608,885 | 3/1997 | Gupta et al. | 395/380 |
| 5,619,720 | 4/1997 | Garde et al. | 395/800 |
| 5,649,138 | 7/1997 | Ireton | 395/393 |
| 5,696,994 | 12/1997 | Pang | 395/884 |

OTHER PUBLICATIONS

C.P.Feigel, "TI Introduces Four–Processor DSP Chip", Microprocessor Report, Mar. 28, 1994, pp. 22–25.

P. Papamichalis et al, "The TMS320C30 Floating–Point Digital Signal Processor", IEEE Micro, Dec. 1988, pp. 13–29.

G.R.L. Sohie et al, "A Digital Signal Processor with IEEE Floating Point Arithmetic", IEEE Micro, Dec. 1988, pp. 49–67.

"State of the Art Power PC 620 Soars", BYTE, Nov. 1994, pp. 114 and 116.

Texas Instruments, TMS320c3X, "User's Guide", Digital Signal Processing Products, 1991, pp. 5–24–5–28.

BIDIRECTIONAL COMMUNICATION PORT FOR DIGITAL SIGNAL PROCESSOR

FIELD OF THE INVENTION

This invention relates to digital signal processors and, more particularly, to a bidirectional communication port for high speed, point-to-point communication between digital signal processors, and between digital signal processors and external devices.

BACKGROUND OF THE INVENTION

A digital signal computer, or digital signal processor (DSP), is a special purpose computer that is designed to optimize performance for digital signal processing applications, such as, for example, fast Fourier transforms, digital filters, image processing and speech recognition. Digital signal processor applications are typically characterized by real time operation, high interrupt rates and intensive numeric computations. In addition, digital signal processor applications tend to be intensive in memory access operations and to require the input and output of large quantities of data. Thus, designs of digital signal processors may be quite different from those of general purpose computers.

One approach that has been used in the architecture of digital signal processors to achieve high speed numeric computation is the Harvard architecture, which utilizes separate, independent program and data memories so that the two memories may be accessed simultaneously. This architecture permits an instruction and an operand to be fetched from memory in a single clock cycle. Current architectures integrate the computation unit and the memory on a single integrated circuit, or chip, to provide a self-contained, high performance digital signal processor.

One important aspect of DSP chips is external communication. Because the DSP processes the large quantities of data, it is necessary to transfer data to and from the internal memory and the computation unit of the DSP chip efficiently and at high speed. The DSP chip typically includes a parallel external bus for communicating with a host computer, an external memory and other external devices such as, for example, an analog-to-digital converter. The external bus may also be used to interconnect two or more DSP chips in a multiprocessor configuration, or cluster, for increased computational capability. The bus architecture provides the ability to transfer information between devices at high speed.

Despite the capabilities provided by the external bus, a need frequently exists for high speed, point-to-point communication between digital signal processors in a multiprocessor configuration or between a digital signal processor and an external device, such as an analog-to-digital converter. The point-to-point communication link may be used for transferring the large quantities of data typically involved in DSP computations without using the external bus, which may be required for other operations.

One well-known approach to point-to-point data transmission is serial communication, wherein data is transmitted serially on a single data line. This technique is efficient with respect to cabling and connections to the DSP chip but is limited in the rate at which data can be transferred.

Parallel data transfer techniques provide the highest speed. However, where multiple communication ports are required, the number of connections to the DSP chip is excessive, and the number of conductors required for each port must be minimized.

A point-to-point communication system for a digital signal processor is disclosed in U.S. Pat. No. 5,619,720 issued Apr. 8, 1997 to Douglas Garde et al. The disclosed communication port is bidirectional and transfers nibbles of four bits at a time on four data lines. While this approach provides highly satisfactory performance, communication with the external device on the external bus of the digital signal processor is required to change the direction of transmission. This approach may produce delays and is relatively complex.

Accordingly, there is a need for improved high speed, point-to-point communication apparatus. The communication apparatus should require a small number of conductors, should be capable of transferring large quantities of data at high speed with minimum overhead and should permit the direction of transmission to easily be changed.

SUMMARY OF THE INVENTION

According to a first aspect of the invention, a bidirectional communication port for communication with an external device is provided in a digital signal processor. The bidirectional communication port comprises first transmitting means for transmitting to the external device a first clock on a first control line in a transmit mode and for transmitting data words on plural data lines in synchronism with the first clock, and first receiving means for receiving from the external device a first acknowledge signal on a second control line in the transmit mode. The bidirectional communication port further comprises second receiving means for receiving a second clock on the second control line in a receive mode and for receiving data words on the plural data lines in synchronism with the second clock, and second transmitting means for transmitting a second acknowledge signal on the first control line in the receive mode. The communication port further comprises switching means for switching between the transmit mode and the receive mode. The communication port may be used for high speed communication between digital signal processors or for communication between a digital signal processor and an external device.

In one embodiment, the first transmitting means includes means for transmitting data words of m bits each, each of the data words being transmitted on 8 data lines as a series of m/8 bytes. The second receiving means includes means for receiving data words of m bits each, and each of the data words is received on the 8 data lines as a series of m/8 bytes.

The switching means may include means for asserting the first clock in the receive mode to thereby generate a transmit request to switch from the receive mode to the transmit mode. The switching means may further include means responsive to assertion of the second clock in the transmit mode for switching from the transmit mode to the receive mode.

The first transmitting means may include means for transmitting a verification byte following the transmission of a predetermined number of data bytes. The verification byte may comprise a checksum byte. The second receiving means may comprise means for receiving a verification byte following a predetermined number of received data bytes and means responsive to the verification byte for detecting an error in the received data byes.

The first receiving means may include means responsive to a transition in the first acknowledge signal during transmission of a data word for confirming connection of the communication port to the external device. The first receiving means may further include means responsive to deassertion of the first acknowledge signal for a timeout period for indicating a fault condition. The second receiving means may include means responsive to an unchanging state of the second clock for a predetermined time for indicating a fault condition.

The bidirectional communication port may include a third control line. In one configuration, the third control line indicates the direction of transmission of the communication port. In another configuration, the third control line is used for frame synchronization.

According to another aspect of the invention, a method for bidirectional communication between a digital signal processor and an external device is provided. The digital signal processor transmits to the external device a first clock on a first control line in a transmit mode and transmits data words on plural data lines in synchronism with the first clock. The digital signal processor receives from a external device a first acknowledge signal on a second control line in the transmit mode. The digital signal processor receives a second clock on the second control line in a receive mode and receives data words on the plural data lines in synchronism with the second clock. The digital signal processor transmits a second acknowledge signal on the first control line in the receive mode.

BRIEF DESCRIPTION OF THE DRAWINGS

For a better understanding of the present invention, reference is made to the accompanying drawings, which are incorporated herein by reference in which.

DETAILED DESCRIPTION

Figure 1:
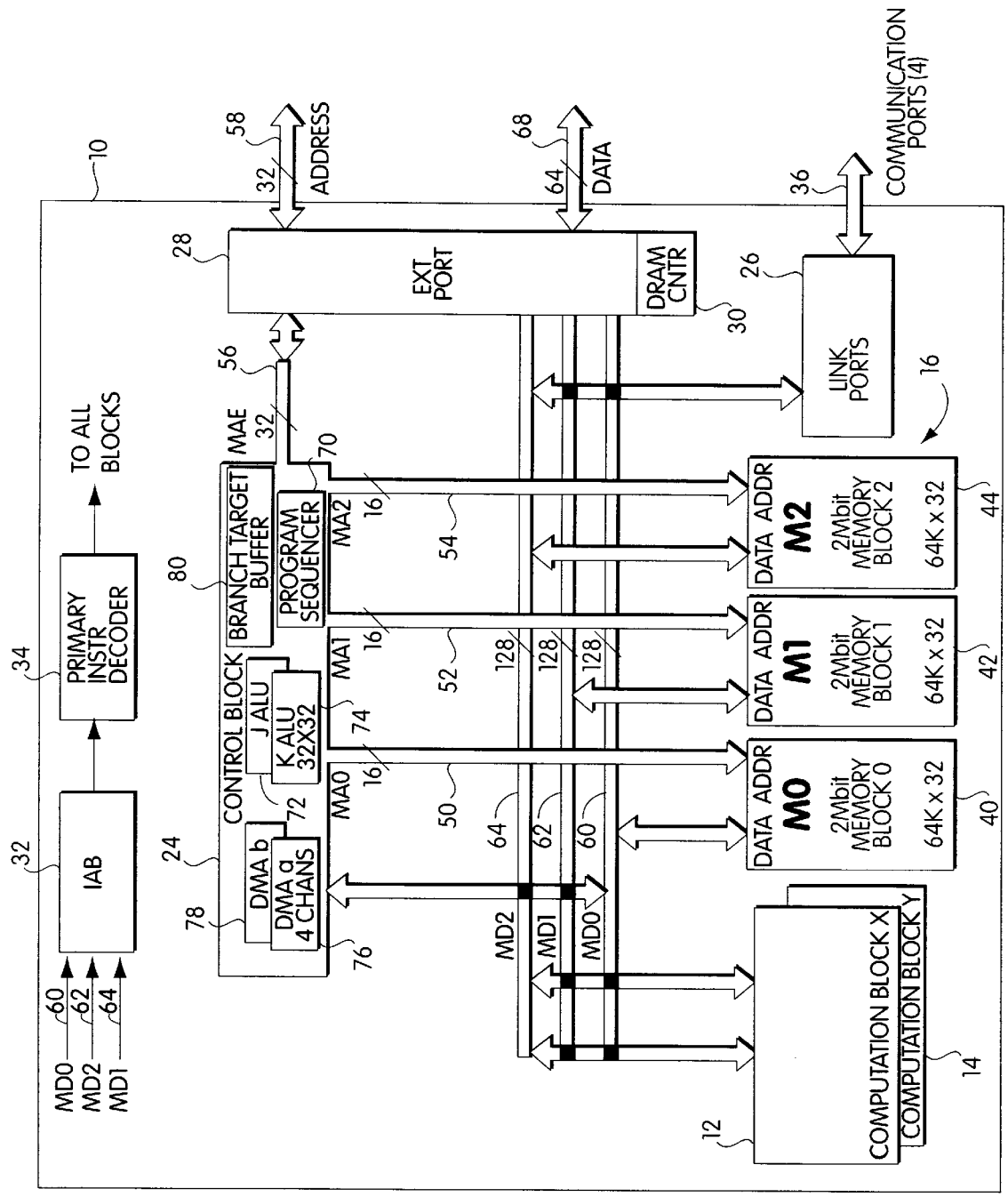
FIG. 1 is a block diagram of a digital signal processor in accordance with the present invention.

A block diagram of a digital signal processor (DSP) 10 in accordance with the present invention is shown in FIG. 1. The principal components of DSP 10 are computation blocks 12 and 14, a memory 16, a control block 24, link ports 26, an external port 28, a DRAM controller 30, an instruction alignment buffer (IAB) 32 and a primary instruction decoder 34. The computation blocks 12 and 14, the instruction alignment buffer 32, the primary instruction decoder 34 and the control block 24 constitute a core processor which performs the main computation and data processing functions of the DSP 10. The external port 28 controls external communications via an external address bus 58 and an external data bus 68. The link ports 26 control external communication via communication ports 36. The DSP is preferably configured as a single monolithic integrated circuit and is preferably fabricated using a 0.35 micron gate, four metal, SRAM CMOS process. In a preferred embodiment, an external clock (not shown) at a frequency of 41.5 MHz is internally multiplied by four to provide an internal clock at 166 MHz.

The memory 16 includes three independent, large capacity memory banks 40, 42 and 44. In a preferred embodiment, each of the memory banks 40, 42 and 44 has a capacity of 64K words of 32 bits each. As discussed below, each of the memory banks 40, 42 and 44 preferably has a 128 bit data bus. Up to four consecutive aligned data words of 32 bits each can be transferred to or from each memory bank in a single clock cycle.

The elements of the DSP 10 are interconnected by buses for efficient, high speed operation. Each of the buses includes multiple lines for parallel transfer of binary information. A first address bus 50 (MA0) interconnects memory bank 40 (M0) and control block 24. A second address bus 52 (MA1) interconnects memory bank 42 (M1) and control block 24. A third address bus 54 (MA2) interconnects memory bank 44 (M2) and control block 24. Each of the address buses 50, 52 and 54 is preferably 16 bits wide. An external address bus 56 (MAE) interconnects external port 28 and control block 24. The external address bus 56 is interconnected through external port 28 to external address bus 58. Each of the external address buses 56 and 58 is preferably 32 bits wide. A first data bus 60 (MD0) interconnects memory bank 40, computation blocks 12 and 14, control block 24, link ports 26, IAB 32 and external port 28. A second data bus 62 (MD1) interconnects memory bank 42, computation blocks 12 and 14, control block 24, link ports 26, IAB 32 and external port 28. A third data bus 64 (MD2) interconnects memory bank 44, computation blocks 12 and 14, control block 24, link ports 26, IAB 32 and external port 28. The data buses 60, 62 and 64 are connected through external port 28 to external data bus 68. Each of the data buses 60, 62 and 64 is preferably 128 bits wide, and external data bus 68 is preferably 64 bits wide.

The first address bus 50 and the first data bus 60 comprise a bus for transfer of data to and from memory bank 40. The second address bus 52 and the second data bus 62 comprise a second bus for transfer of data to and from memory bank 42. The third address bus 54 and the third data bus 64 comprise a third bus for transfer of data to and from memory bank 44. Since each of the memory banks 40, 42 and 44 has a separate bus, the memory banks 40, 42 and 44 may be accessed simultaneously. As used herein, "data" refers to binary words, which may represent either instructions or operands that are associated with the operation of the DSP 10. In a typical operating mode, program instructions are stored in one of the memory banks, and operands are stored in the other two memory banks. Thus, at least one instruction and two operands can be provided to computation blocks 12 and 14 in a single clock cycle. As described below, each of the memory banks 40, 42, and 44 is configured to permit reading and writing of multiple data words in a single clock cycle. The simultaneous transfer of multiple data words from each memory bank in a single clock cycle is accomplished without requiring an instruction cache or a data cache.

The control block 24 includes a program sequencer 70, a first integer ALU 72 (J ALU), a second integer ALU 74 (K ALU), a first DMA address generator 76 (DMAG A), a second DMA address generator 78 (DMAG B) and a branch target buffer 80. The integer ALU's 72 and 74, at different times, execute integer ALU instructions and perform data address generation. During execution of a program, the program sequencer 70 supplies a sequence of instruction addresses on one of the address buses 50, 52, 54 and 56, depending on the memory location of the instruction sequence. Typically, one of the memory banks 40, 42 or 44 is used for storage of the instruction sequence. Each of the integer ALU's 72 and 74 supplies a data address on one of the address buses 50, 52, 54 and 56, depending on the location of the operand required by the instruction. Assume, for example, that an instruction sequence is stored in memory bank 40 and that the required operands are stored in memory banks 42 and 44. In this case, the program sequencer supplies instruction addresses on address bus 50 and the accessed instructions are supplied to the instruction alignment buffer 32, as described below. The integer ALU's 72 and 74 may, for example, output addresses of operands on address buses 52 and 54, respectively. In response to the addresses generated by integer ALU's 72 and 74, the memory banks 42 and 44 supply operands on data buses 62 and 64, respectively, to either or both of the computation blocks 12 and 14. The memory banks 40, 42 and 44 are interchangeable with respect to storage of instructions and operands.

The program sequencer 70 and the integer ALU's 72 and 74 may access an external memory (not shown) via external port 28. The desired external memory address is placed on address bus 56. The external address is coupled through external port 28 to external address bus 58. The external memory supplies the requested data word or data words on external data bus 68. The external data is supplied via external port 28 and one of the data buses 60, 62 and 64 to one or both of computation blocks 12 and 14. The DRAM controller 30 controls the external memory.

As indicated above, each of the memory banks 40, 42 and 44 preferably has a capacity of 64k words of 32 bits each. Each memory bank may be connected to a data bus that is 128 bits wide. In an alternative embodiment, each data bus may be 64 bits wide, and 64 bits are transferred on each of clock phase 1 and clock phase 2, thus providing an effective bus width of 128 bits. Multiple data words can be accessed in each memory bank in a single clock cycle. Specifically, data can be accessed as single, dual or quad words of 32 bits each. Dual and quad accesses require the data to be aligned in memory. Typical applications for quad data accesses are the fast Fourier transform (FFT) and complex FIR filters. Quad accesses also assist double precision operations. Preferably, instructions are accessed as quad words. However, as discussed below, instructions are not required to be aligned in memory.

Using quad word transfers, four instructions and eight operands, each of 32 bits, can be supplied to the computation blocks 12 and 14 in a single clock cycle. The number of data words transferred and the computation block or blocks to which the data words are transferred are selected by control bits in the instruction. The single, dual, or quad data words can be transferred to computation block 12, to computation block 14, or to both. Dual and quad data word accesses improve the performance of the DSP 10 in many applications by allowing several operands to be transferred to the computation blocks 12 and 14 in a single clock cycle. The ability to access multiple instructions in each clock cycle allows multiple operations to be executed in each cycle, thereby improving performance. If operands can be supplied faster than they are needed by the computation blocks 12 and 14, then there are memory cycles left over that can be used by the DMA address generators 76 and 78 to provide new data to the memory banks 40, 42 and 44 during those unused cycles, without stealing cycles from the core processor. Finally, the ability to access multiple data words makes it possible to utilize two or more computation blocks and to keep them supplied with operands. The ability to access single or dual data words reduces power consumption in comparison with a configuration where only quad data words are accessed.

Figure 2:
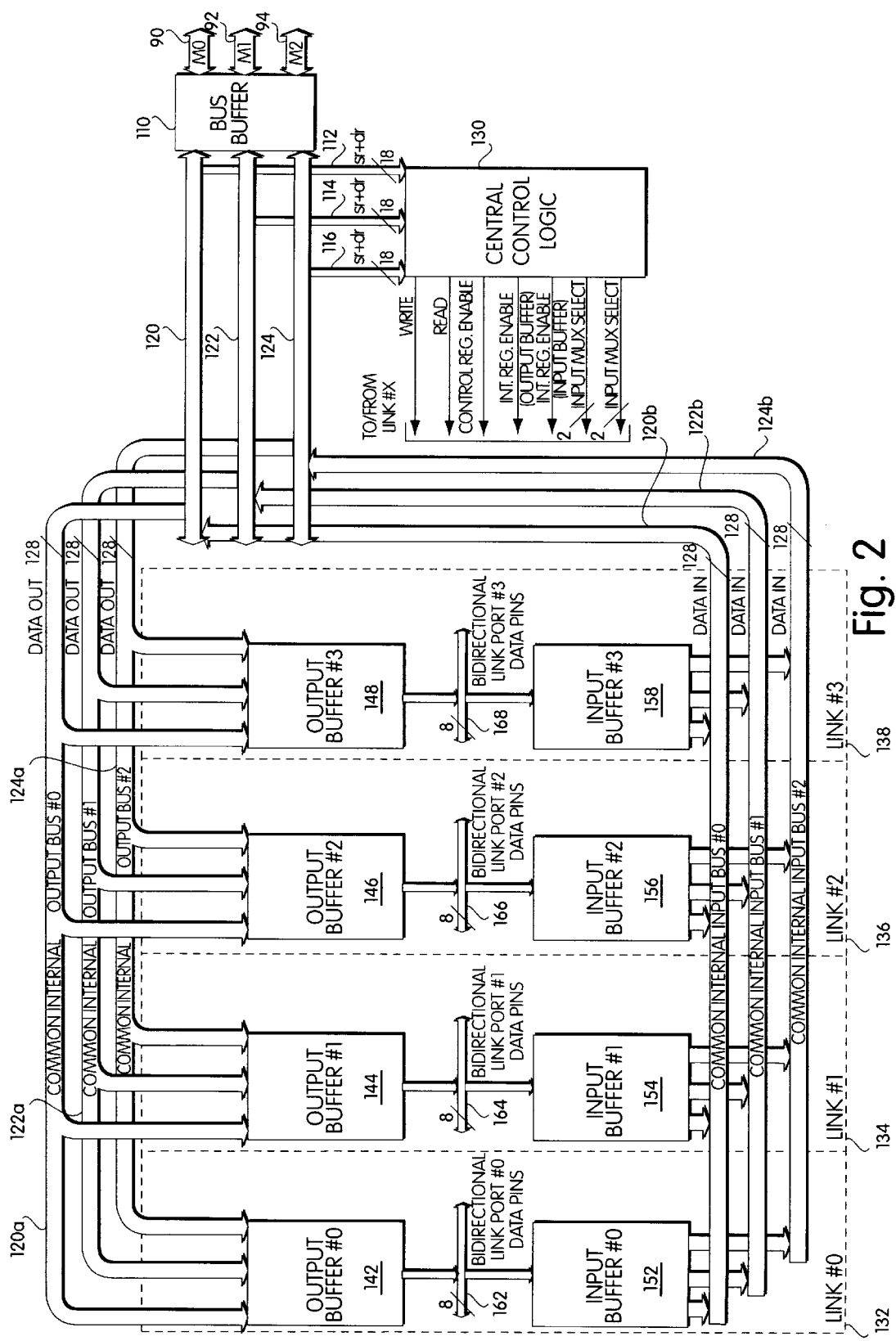
FIG. 2 is a block diagram of the link ports shown in FIG. 1.

A block diagram of the link ports 26 is shown in FIG. 2. In the example of FIG. 2, the digital signal processor includes four bidirectional link ports, or communication ports, 132, 134, 136 and 138. It will be understood that the digital signal processor may include any number of bidirectional communication ports within the scope of the invention. Buses 90, 92 and 94 are coupled to a bus buffer 110. Bus 90 includes data bus 60 (FIG. 1) and address bus 50; bus 92 incudes data bus 62 and address bus 52; and bus 94 includes data bus 64 and address bus 54. Bus buffer 110 couples data buses 60, 62 and 64 to link port data buses 120, 122 and 124, respectively. Bus buffer 110 also couples address buses 50, 52 and 54 to link port address buses 112, 114 and 116, respectively. Address buses 112, 114 and 116 are input to central control logic 130.

Data buses 120,122 and 124 are connected to link ports 132, 134, 136 and 138. More specifically, data bus 120 divides into output bus 120a and input bus 120b; data bus 122 divides into output bus 122a and input bus 122b; and data bus 124 divides into output bus 124a and input bus 124b. Output buses 120a, 122a and 124a are connected to output buffers 142, 144, 146 and 148 in link ports 132, 134, 136 and 138, respectively. Input buses 120b, 122b, and 124b are connected to input buffers 152, 154, 156 and 158 in link ports 132, 134, 136 and 138, respectively. Output buffer 142 and input buffer 152 are connected to data path 162 of link port 132. Similarly, output buffer 144 and input buffer 154 are connected to data path 164 of link port 134; output buffer 146 and input buffer 156 are connected to data path 166 of link port 136; and output buffer 148 and input buffer 158 are connected to data path 168 of link port 138. In the example of FIG. 2, each data path 162, 164, 166 and 168 port has 8 data lines. It will be understood that different numbers of data lines, typically four or more, may be utilized within the scope of the present invention. Data paths 162,164, 166 and 168 are bidirectional. Data to be transmitted is held in the respective output buffers 142, 144, 146 and 148, and received data is held in the respective input buffers 152, 154, 156 and 158.

Figure 3:
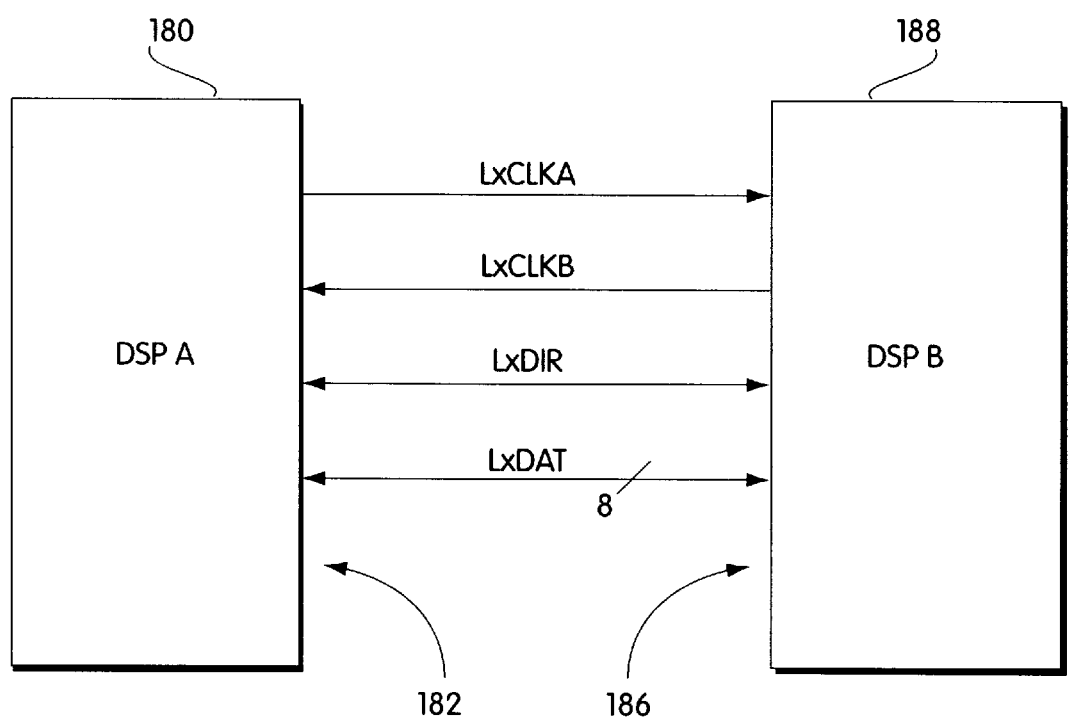
FIG. 3 is a block diagram showing an interconnection between two digital signal processors using bidirectional communication ports in accordance with the invention.

A block diagram of an interconnection between two digital signal processors using a bidirectional communication port in accordance with the invention is shown in FIG. 3. A digital signal processor 180 is interconnected via a link port 182 to a link port 186 of a digital signal processor 188. The link port interconnection includes data lines LxDAT and 2 control lines. As discussed below, a third control line may optionally be used in some cases. In the example of FIG. 3, the link ports have 8 data lines, so that a byte is transferred in parallel. The control lines include a first control line LxCLKA and a second control line LxCLKB.

A preferred protocol for bidirectional data transmission is described with reference to FIG. 3 and the timing diagram of FIG. 4. The control lines LxCLKA and LxCLKB form a handshake pair that permits asynchronous data transfers, wherein the transmitter provides a clock, or strobe, on one clock line, and the receiver provides an Acknowledge signal on the other clock line. One control line is assigned to each digital signal processor. A digital signal processor drives one control line and receives on the other control line. When the DSP is transmitting, the control line is driven as a strobe. When the DSP is receiving, the same control line is driven as an Acknowledge signal.

Figure 4:
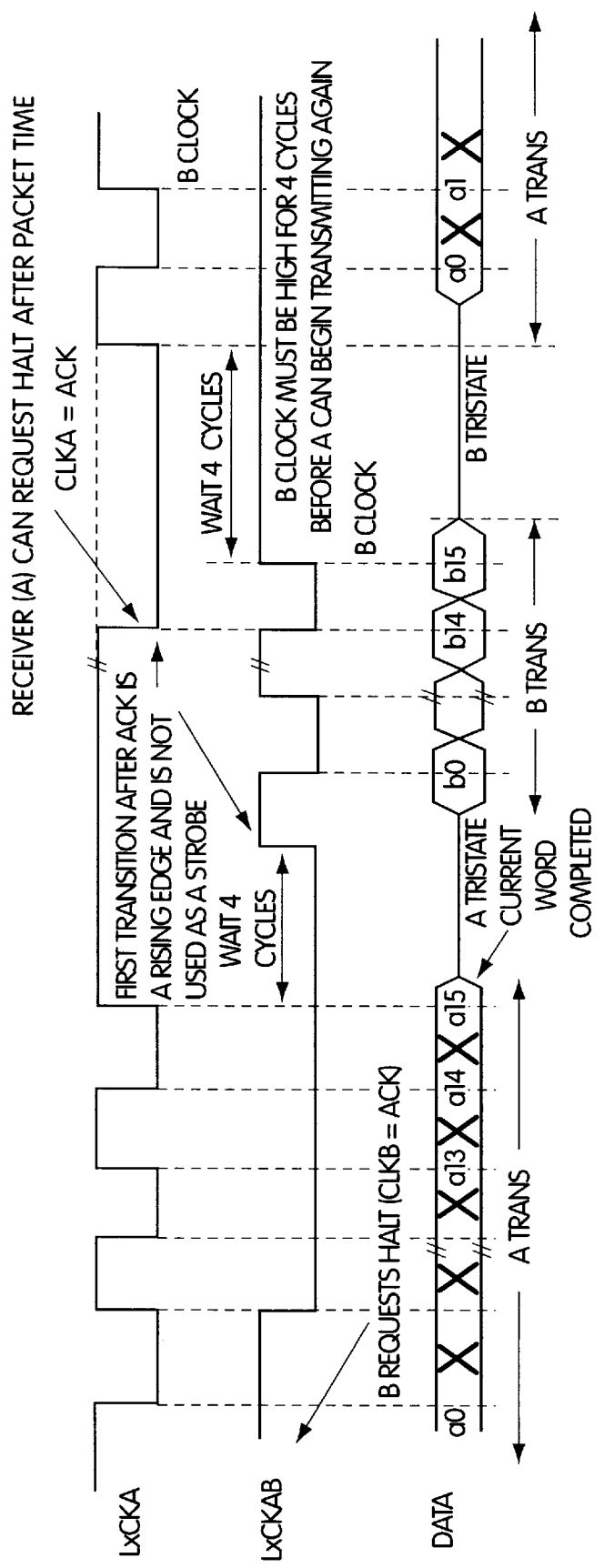
FIG. 4 is a timing diagram that illustrates operation of the bidirectional communicator,port of the invention.

In the example of FIGS. 3 and 4, a 32-bit word transmitted by the link port includes 4 bytes, and a quad word includes 16 bytes. As shown in FIG. 4, two bytes are transmitted on each clock cycle. Both the rising and falling edges of the clock are used to transmit data. A first byte is transmitted on the 8 data lines on the rising edge of the clock, and a second byte is transmitted on the falling edge of the clock. The receiver asserts the Acknowledge signal when it is ready to accept another word in its receive buffer. The transmitter samples the Acknowledge signal near the end of each quad word transmission, i.e., after every 16 bytes. If the Acknowledge signal is deasserted at that time, the transmitter does not transmit a new word. When the Acknowledge signal is eventually asserted again, the transmitter waits 4 cycles, as described below, to be sure that the receiver has not changed transmission direction. Then, the transmitter begins transmission of the next quad word. When the transmit buffer is empty, the clock signal remains high until the buffer is refilled, regardless of the state of the Acknowledge signal.

The link ports permit bidirectional communication in which the data transfer direction may change. The programmer has control of the packet size of the data transmitted before the receiver may request a change of transmission direction. In one example, a 256 word packet or an infinite size packet may be selected. When the 256 word packet is selected, the transmission direction may change after 256 words have been transmitted. When an infinite size packet is selected, the transmitter continues transmitting until it is finished.

When a link port is currently receiving and has data to transmit, i.e., it wants to change direction, it deasserts its Acknowledge signal after a packet of the selected packet size, as indicated by a received word counter, has been received. When the transmitter stops transmitting at the end of the quad word, the receiver can switch to transmit mode and begin transmitting data by using its LxCLK line for sending a strobe instead of the Acknowledge signal. After the transmission direction is switched, an Acknowledge signal is driven by the former transmitter and is checked by the new transmitter. Then the new transmitter transmits data.

As shown in FIG. 4, device A drives the LxCLKA line and device B drives the LxCLKB line. Device A transmits a quad data word a0-a15, with the LxCLKA line carrying a strobe signal driven by device A and the LxCLKB line carrying an Acknowledge signal driven by device B. As discussed below, device A may also transmit a verification byte and an unused byte, or a verification byte and a training byte (not shown). Device B deasserts the Acknowledge signal on the LxCLKB line during transmission of the quad data word. After completion of transmission of quad data word a0-a15 (and any additional bytes associated with the quad data word), device B may begin transmitting by toggling the LxCLKB line as a strobe. It is assumed that quad data word a0-a15 completes a 256 word packet or other selected packet size, so that the transmission direction may be changed. Device B transmits quad data word b0-b15 and any associated bytes, and device A acknowledges quad data word b0-b15 on the LxCLKA line. Alternatively, after completion of transmission of quad data word a0-a15, device B may assert the Acknowledge signal on the LxCLKB line, and device A may continue transmitting.

The transmission direction is controlled by the currently-receiving device. The currently-receiving device may assert the Acknowledge signal on its LxCLK line to indicate that it is ready to receive additional data. Alternatively, the currently-receiving device may begin toggling its LxCLK line as a strobe to indicate that the transmission direction is to be changed. The currently-transmitting device determines whether to continue transmitting or to change direction by examining the LxCLK line from the currently-receiving device. When the LxCLK line from the currently-receiving device remains asserted for a predetermined wait time, such as 4 cycles, the currently-transmitting device recognizes an Acknowledge signal and continues transmitting. When the LxCLK line from the currently-receiving device is toggled, the currently-transmitting device recognizes a change in transmission direction and changes from transmit mode to receive mode. The predetermined wait time can be any time that is sufficient to distinguish between an Acknowledge signal and a strobe on the LxCLK line from the currently-receiving device.

The bidirectional link ports of the present invention may include an optional control line LxDIR, which may perform two different functions (at different times). In a first configuration, the LxDIR line indicates the direction of transmission of the link port. The direction control signal may be utilized when a driver circuit external to the DSP chip is used, for example, to transmit over relatively long distances or to transmit on optical fibers. The state of the direction control signal indicates the direction of transmission.

In a second configuration, the LxDIR line is used for frame synchronization in multiple channel transmission. In the receive mode, the frame synch signal may be asserted low to signify an end of frame/buffer. The frame synch signal is sampled on the link clock rising edge at the end of a quad word. The transition from logic "1" to logic "0" signifies end of buffer. This is interpreted as meaning that the bytes that have been received thus far, including the last one, are the complete buffer. In the transmit mode, the frame synch signal signifies end of buffer and is asserted low just prior to the last byte of the current DMA being driven on the link port. The transmit frame synch signal is deasserted high when a new DMA block begins transmitting.

Figure 5:
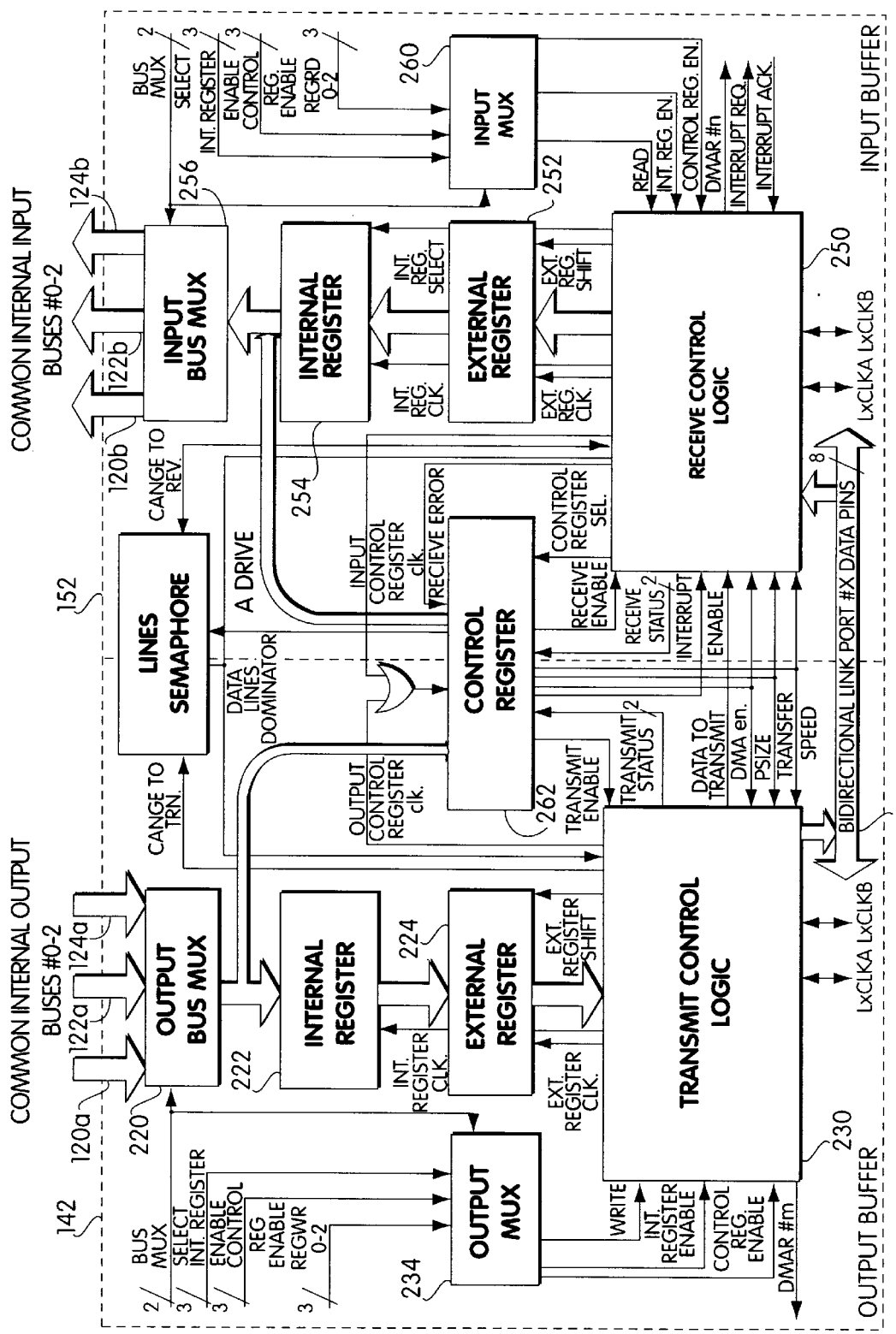
FIG. 5 is a block diagram of the input buffer and output buffer of a link port.

Block diagrams of output buffer 142 and input buffer 152 of link port 132 are shown in FIG. 5. A selected one of output buses 120a, 122a and 124a is connected by an output bus multiplexer 220 to an internal register 222. The outputs of internal register 222 are connected to inputs of an external register 224. The outputs of external register 224 connected through transmit control logic 230 to data path 162. The LxCLKA and LxCLKB control lines are connected to transmit control logic 230. An output multiplexer 234 selects control lines for the appropriate bus and provides the selected control lines to transmit control logic 230.

In input buffer 152, data path 162 is coupled through receive control logic 250 to an external register 252. The outputs of external register 252 are coupled to inputs of an internal register 254, and the outputs of internal register 254 are coupled to an input bus multiplexer 256. The input bus multiplexer 256 couples the outputs of internal register 254 to a selected one of input buses 120b, 122b and 124b. An input multiplexer 260 selects control signals and provides the selected control signals to receive control logic 250. The LxCLKA and LxCLKB control lines are connected to receive control logic 250. A control register 262 contains control information for controlling the operation of the input and output buffers.

When the link port is transmitting, internal register 222 accepts internal memory data or DMA data. External register 224 performs unpacking of the quad data word into bytes, with the most significant byte first. Registers 222 and 224 form a two-stage first-in first-out buffer (FIFO). Two writes can be made to the buffer by the internal memory or the DMA controller before a full condition is signaled. As each data word is unpacked and transmitted, the next location in the FIFO becomes available and a new request may be made. If the register becomes empty, the clock is deasserted.

When the link port is receiving, external register 252 is used to pack the received data, with the most significant byte first. The data is passed from external register 252 to internal register 254 before it is transferred to internal memory or the DMA controller. The buffer formed by registers 252 and 254 appears to the link port input to be an eight-word deep FIFO. If the DMA controller does not service the buffer before all locations are filled, then the Acknowledge signal is deasserted. When the internal register 254 is accessed by the DMA controller or by the internal memory, it appears as a two-word deep FIFO. Reception handshake is established by the receive control logic 250 as described below.

Figure 6:
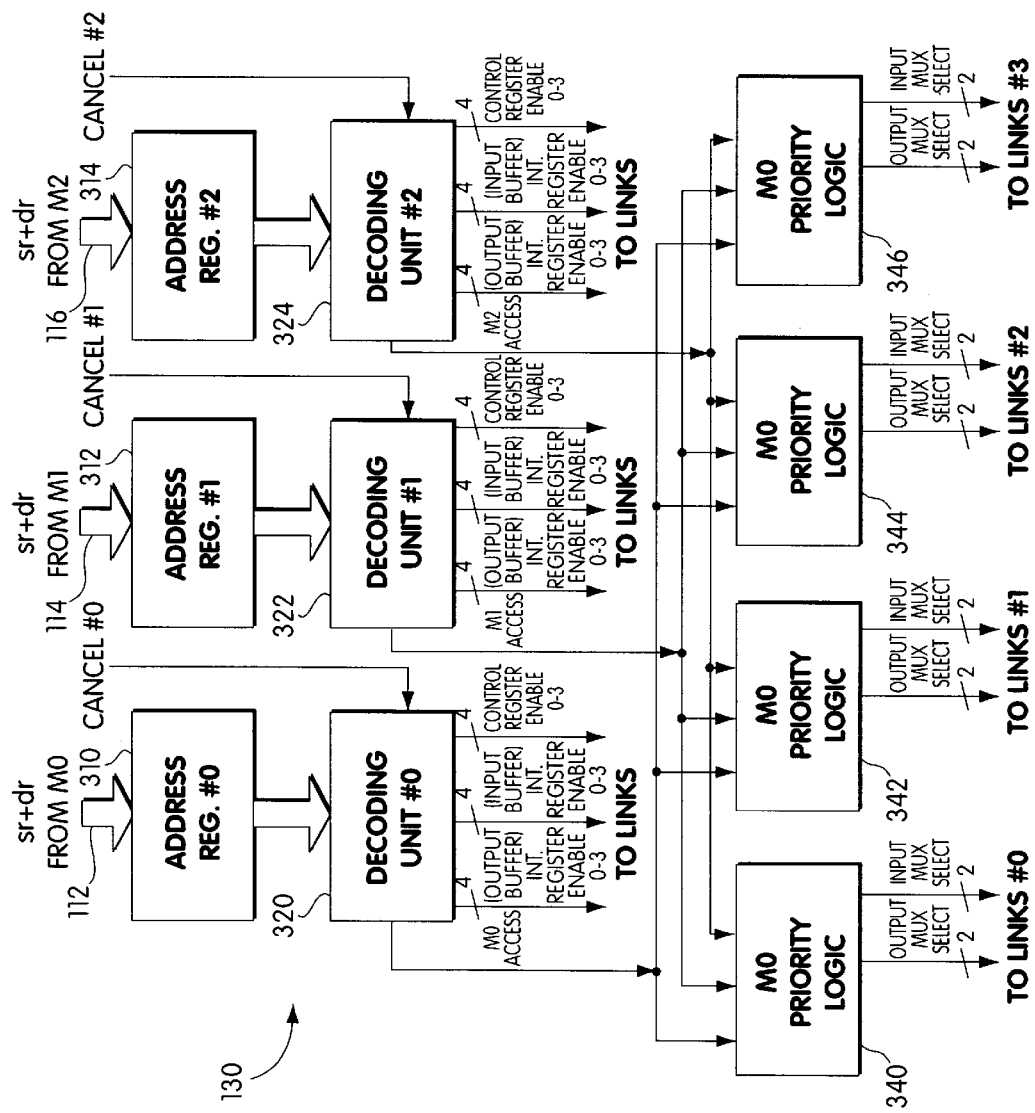
FIG. 6 is Qblock diagram of the central control logic shown in FIG. 2.

A block diagram of the central control logic 130 is shown in FIG. 6. The central control logic controls bus selection and addressing. Each link port has three registers which are mapped to the global memory map: input buffer internal register 254 (read only), output buffer internal register 222 (write only) and control register 262 (read and write). Addresses on link port address buses 112, 114 and 116 are latched in address registers 310, 312 and 314, respectively. The outputs of address registers 310, 312 and 314 are coupled to decoding units 320, 322 and 324, respectively. The decoding units generate enable signals for the output buffer internal register 222, the input buffer internal register 254 and the control register 262 in each of the four link ports in accordance with the received addresses. Additional outputs of decoding units 320, 322 and 324 are supplied to priority logic units 340, 342, 344 and 346, one corresponding to each link port. The outputs of the priority logic units supply select signals to output bus multiplexer 220 and input bus multiplexer 256 in each of the link ports.

Figure 7:
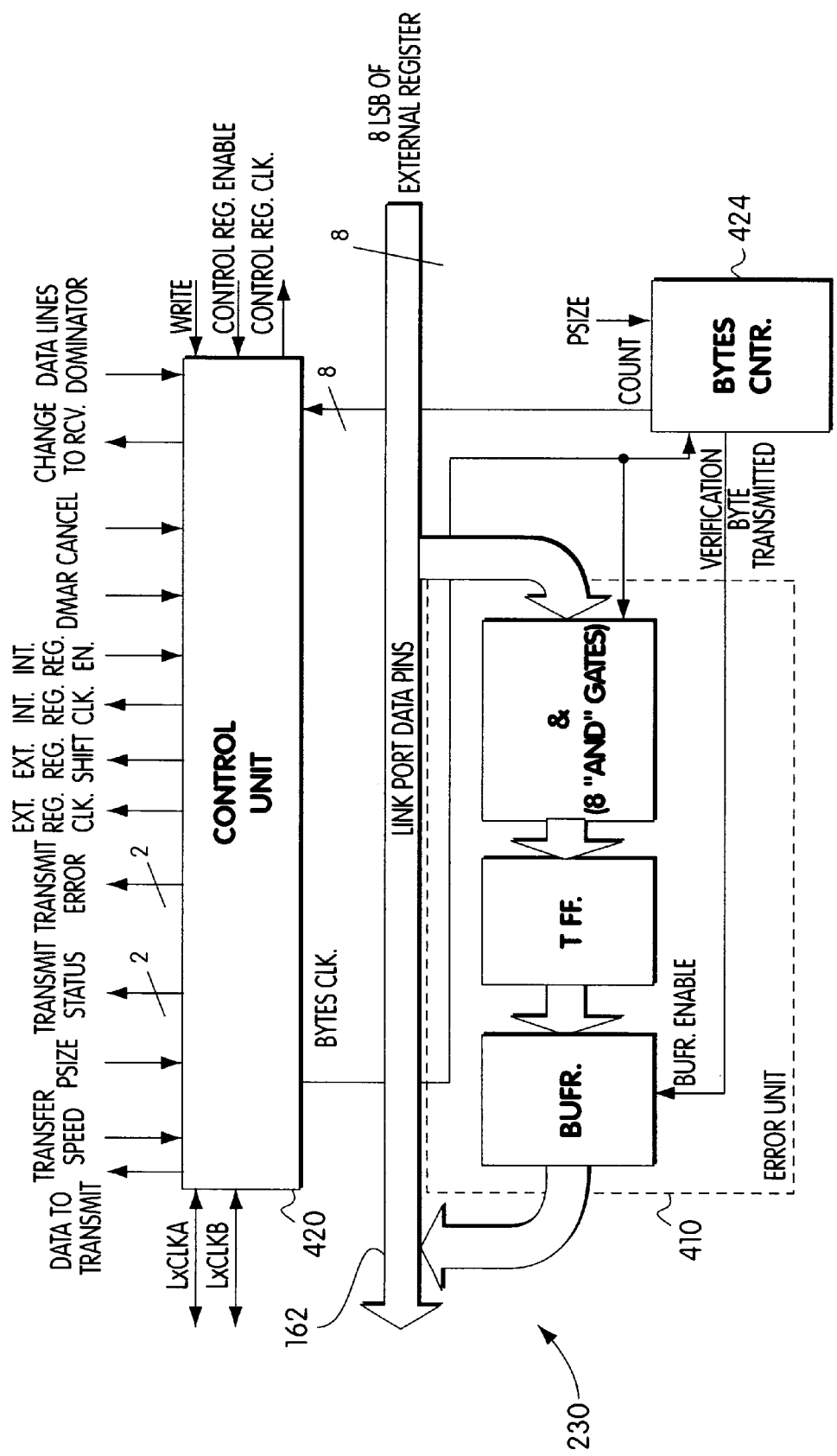
FIG. 7 is block diagram of the transmit control logic shown in FIG. 5.

A block diagram of transmit control logic 230 (FIG. 5) is shown in FIG. 7. Link port data path 162 passes through transmit control logic 230 and is coupled to an error unit 410, which detects a transmit error. The LxCLKA and LxCLKB control lines are coupled to a control unit 420. A byte counter 424 counts transmitted bytes and supplies a count to control unit 420. Error unit 410 generates a verification byte, as described below.

Figure 8:
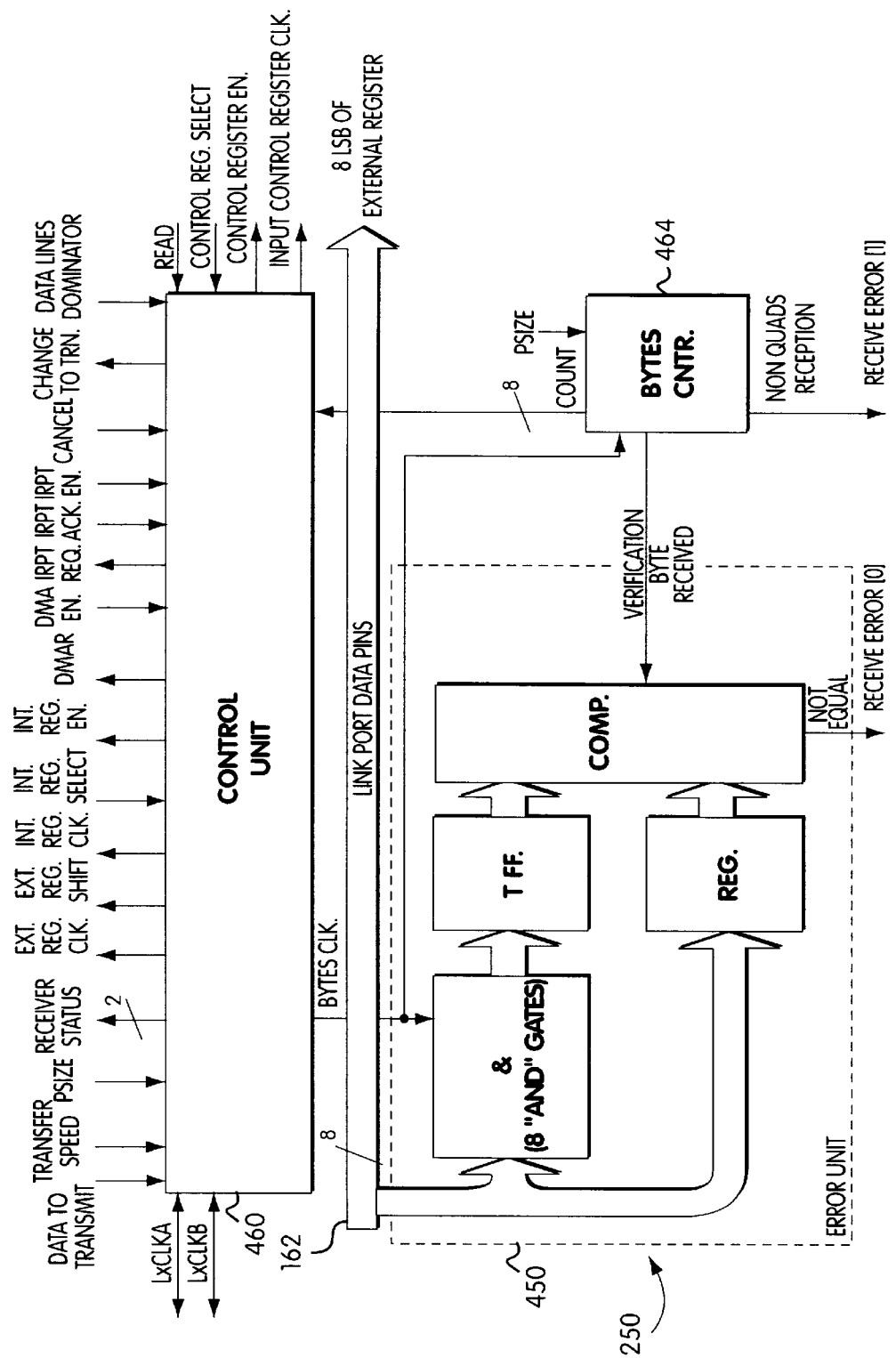
FIG. 8 is a block diagram of the receive control logic shown in FIG. 5.

A block diagram of receive control logic 250 (FIG. 5) is shown in FIG. 8. The link port data path 162 passes through receive control logic 250 and is coupled to an error unit 450, which detects a receive error. The control lines LxCLKA and LxCLKB are coupled to a control unit 460. A byte counter 464 counts received bytes and supplies a count to control unit 460. The error unit 450 generates a local verification byte from the received data bytes and compares the local verification byte with the received verification byte to determine an error condition, as described below.

Thus far, the bidirectional link ports of the present invention have been described in connection with point-to-point communication, wherein one device is connected to each end of a communication channel. According to a further feature of the invention, the link ports of three or more devices may be connected in a bus configuration. The bus configuration of the bidirectional link ports may operate in a point-to-point mode, wherein one digital signal processor connected to the bus transmits and another device receives, all other devices connected to the bus being tristated. In a broadcast mode, one digital signal processor broadcasts data to the other devices connected to the link port bus. In the broadcast mode, the Acknowledge signals are wire-ored so that any device connected to the bus can deassert the Acknowledge signal. When the link ports are used in a bus configuration, communication between devices over the external bus 58, 68 (FIG. 1) is necessary to establish which device on the link port bus is transmitting and which device or devices are receiving.

According to another feature of the invention, the link ports may operate in a flow-through configuration. Referring again to FIG. 2, data may, for example, be received by link port 132 from one external device and may be passed to link port 134 for transmission to a second external device. In particular, the data received on data path 162 is transferred from input buffer 152 of link port 132 to output buffer 144 of link port 134 for transmission on data path 164.

According to a further feature of the invention, the link ports may be used for DMA transfers to and from the internal memory 16 (FIG. 1) of the DSP or for DMA transfers to and from external memory via the external bus 58, 68. The bidirectional link ports of the present invention may include one or more error detection features. In a first error detection feature, a verification byte may be transmitted following a predetermined number of data bytes. For example, a verification byte may be transmitted following each quad word of 16 bytes. The verification byte may be calculated based on the data bytes transmitted using a conventional checksum calculation. The receiver makes the same calculation on the received data bytes and generates a local verification byte. The local verification byte is compared with the received verification byte. If the local verification byte does not match the received verification byte, an error condition is indicated. The receiver may generate an exception interrupt and/or deassert its Acknowledge signal.

According to another error detection feature, the receiver deasserts the Acknowledge signal temporarily during each quad word transmission. If the transmitter does not detect a transition in the Acknowledge signal during a transmission, a receiver failure is indicated and an exception interrupt is generated. This feature checks for a permanently asserted condition of the acknowledge signal. In another error detection feature, the transmitter may utilize a timeout to detect an error condition wherein the Acknowledge signal is permanently deasserted. If the acknowledge signal from the receiver remains deasserted for a programmable timeout period, a receiver error is indicated and an exception interrupt is generated. Similarly, the receiver may utilize a timeout with respect to the clock signal received from the transmitter. If the clock state at the receiver does not change for a programmable timeout period, a transmitter error is indicated and an exception interrupt is generated. These features check connectivity between the transmitter and the receiver. A software check for connectivity may also be implemented. A timer may periodically start an interrupt routine which sends a message to the receiver. The message interrupts the destination device and causes a message to be sent back to the transmitter, thus verifying the connection.

The bidirectional link ports of the present invention are designed for a high data transfer rate. In one example, the link ports use a 100 MHz clock, resulting in a 200 MHz data rate because two bytes are transferred on each clock cycle. Ribbon coaxial cable may be used for interconnecting link ports. At these clock frequencies, clock skew relative to data lines and skew between data lines may produce errors in data transmission. According to a further feature of the bidirectional link ports of the present invention, a training sequence may be transmitted with the data to permit correction of timing skew. In particular, a training byte may be transmitted following each quad word. Thus, each quad word of 16 bytes may be followed by a verification byte and a training byte. The training bytes may be varied according to a predetermined pattern that is known to the receiver. The receiver is provided with a circuit for varying the timing delay of each received data signal by an amount ±pΔ, where Δmay, for example, be 200 picoseconds and p may be 0, 1, 2, 3, etc. A timing delay of pΔis introduced when a training byte is received. The timing delay is increased on successive training bytes until an error occurs. The error may be detected because the content of the training byte is known to the receiver. A timing delay of the opposite polarity is then introduced on successive training bytes until an error occurs. The correct timing may be established as the center of the range between positive and negative timing delays which produce errors. The correct delay is used for receipt of data bytes. The training sequence may be repeated as often as desired.

Figure 9A:
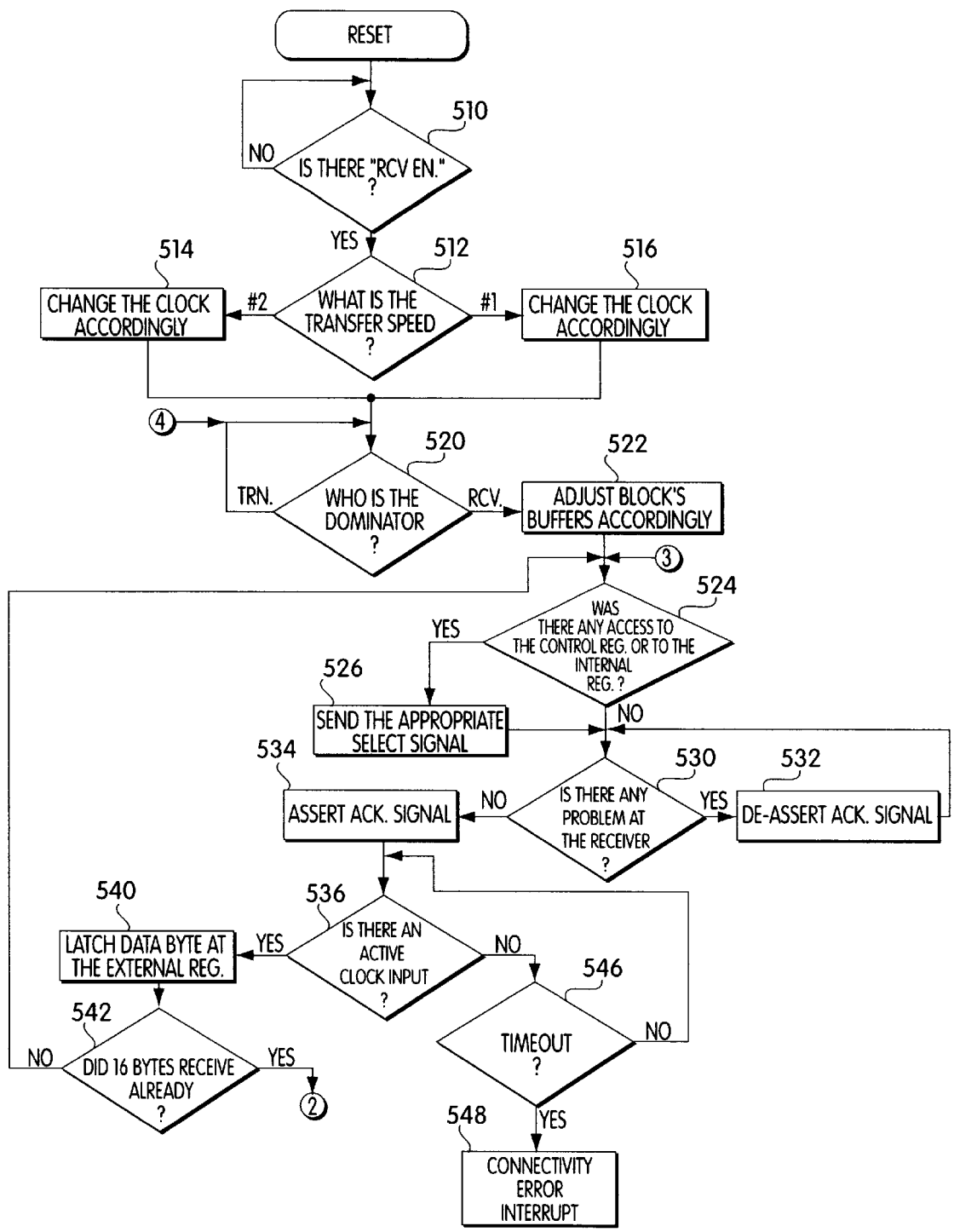
FIGS. 9A and 9B show a flow chart of the operation of the receive control logic of FIG. 8.

Operation of the control unit 460 (FIG. 8) in the receive control logic 250 is described with reference to the flow chart of FIGS. 9A and 9B. In the following, the link port is described as having a transmitter and a receiver, one of which has control of the link port. If the receiver is determined to be enabled in step 510, the programmed transfer speed is checked in step 512 and is changed as necessary in step 514 or 516. If the transmitter is the dominator (has control of the link port), as determined in step 520, the receiver waits. Otherwise, the receiver buffers are set in step 522 and a determination is made in step 524 as to whether the control register 262 or the input buffer internal register 254 has been accessed by another resource. If the control register or the input buffer internal register has been accessed, the appropriate select signal is sent to the control logic in step 526. If a receiver problem is detected in step 530, the Acknowledge signal is deasserted in step 532 and further operation is terminated. If a receiver problem is not detected, the Acknowledge signal is asserted in step 534. The receiver then looks for an active clock input in step 536. When an active clock input is detected, the byte on data path 162 is latched into external register 252 (FIG. 5) in step 540. In step 542, a determination is made as to whether 16 bytes have been received. When 16 bytes have not been received, the process returns to step 524 to receive additional bytes. After 16 bytes have been received, the process proceeds to step 550 (FIG. 9B) for processing of the verification byte. If an active clock input is not detected in step 536, a determination is made in step 546 as to whether a prescribed timeout period has elapsed. If the timeout period has not elapsed, the process returns to step 536 to look for an active clock input. After the timeout period has elapsed, a connectivity error interrupt is generated in step 548.

Figure 9B:
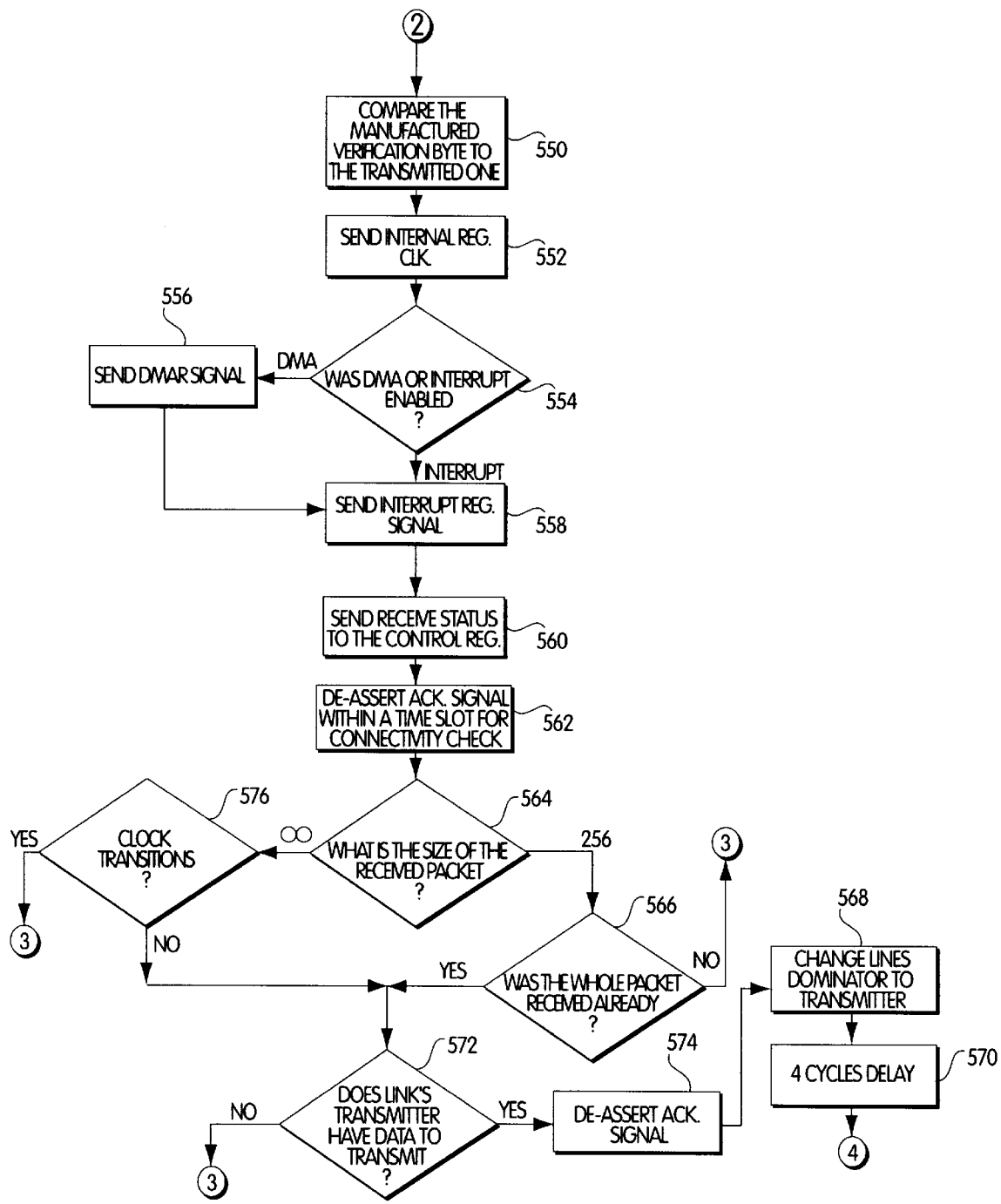

Referring now to FIG. 9B, a local verification byte is compared to the received verification byte in step 550 and the internal register is clocked in step 552. A determination is made in step 554 as to whether the DMA or interrupt is enabled. When the DMA is enabled, a DMA request signal, DMAR, is sent to the DMA controller in step 556. When the interrupt is enabled, an interrupt request signal is generated in step 558. In step 560, the receive status is sent to control register 262. In step 562, the Acknowledge signal is deasserted in a predetermined time slot to perform a connectivity check.

In step 564, the programmed size of the received packet is checked. In the example of FIG. 9B, it is assumed that the packet size may be 256 words or an infinite number of words. When a packet size of 256 words is selected, a determination is made in step 566 as to whether a complete packet has been received. When a complete packet has been received, a determination is made in step 572 as to whether the transmitter in the presently-receiving link port has data to transmit. When the transmitter in the presently-receiving link port does have data to transmit, the Acknowledge signal is deasserted in step 574 and the process proceeds to step 568 to change to the transmit mode. A four cycle delay is initiated in step 570, and the process then returns to step 520 to wait until the receiver again becomes active. When a complete packet has not been received, as determined in step 566, or the transmitter in the presently-receiving link port does not have data to transmit, as determined in step 572, the process returns to step 524 (FIG. 9A) for receiving another quad data word. When the receiver is programmed to receive an infinite size packet, as determined in step 564, a determination is made in step 576 as to whether clock transitions are being received from the transmitter. When clock transitions are being received, the process returns to step 524 for receiving another quad data word. When clock transitions are not being received, as determined in 576, a determination is made in step 572 as to whether the transmitter in the presently receiving link port has data to transmit. The process advances from step 572 as described above.

Figure 10A:
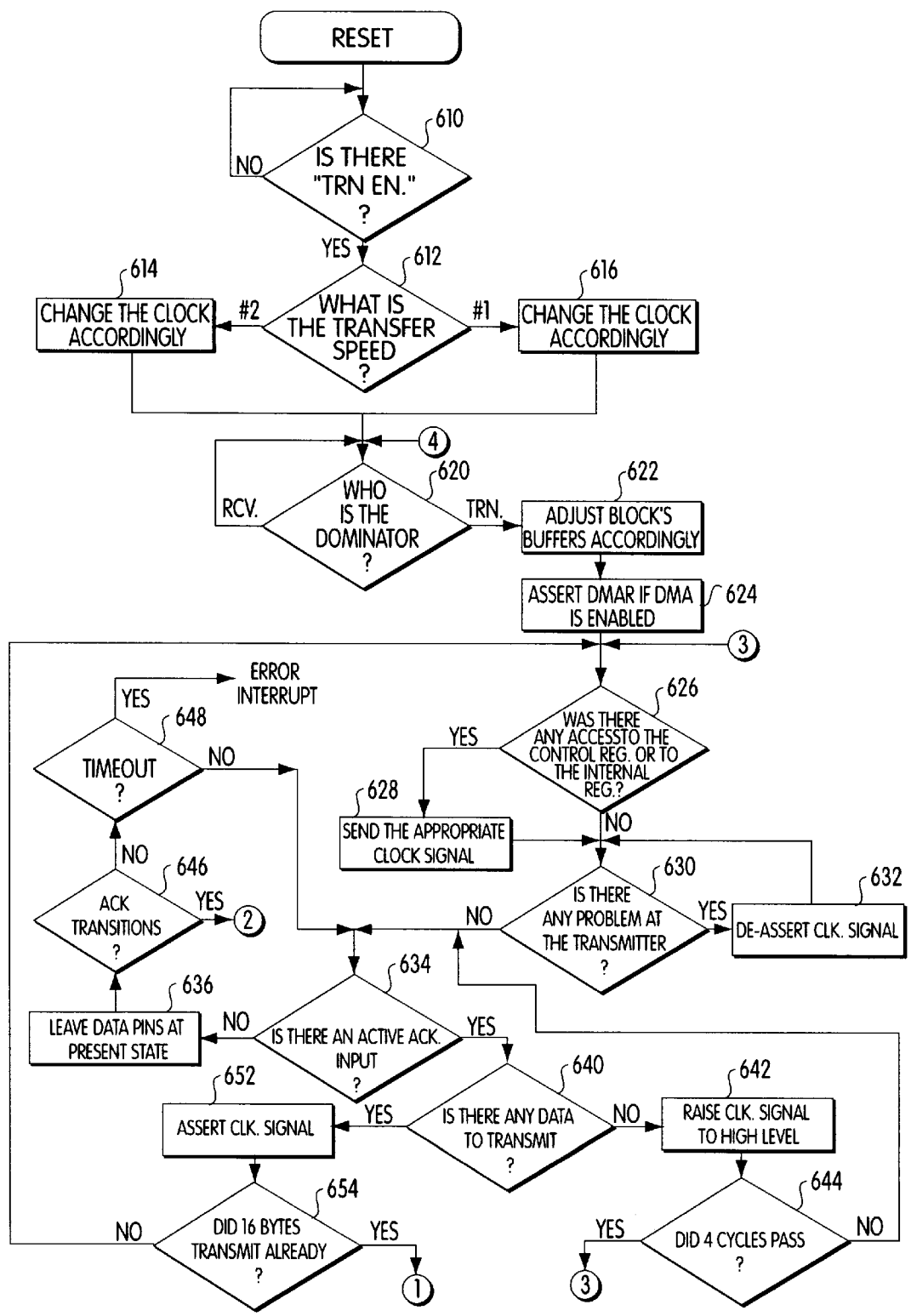
FIGS. 10A and 10B show a flow chart of the operation of the transmit control logic of FIG. 7.

Operation of the control unit 420 (FIG. 7) in transmit control logic 230 is described with reference to the flow chart of FIGS. 10A and 10B. In step 610, a determination is made as to whether the transmitter is enabled. When the transmitter is enabled, the programmed transfer speed is determined in step 612, and the clock is changed as necessary in step 614 or step 616. In step 620, a determination is made as to whether the transmitter or the receiver is the dominator. When the receiver is the dominator, the transmitter remains in a wait state. When the transmitter is the dominator, the transmitter buffers are set in step 622, and DMA request signal, DMAR, is asserted in step 624 if DMA is enabled.

In step 626, a determination is made as to whether the control register 262 or the output buffer internal register 222 has been accessed. When the control register or the internal register has been accessed, the appropriate clock signal is sent to the control logic in step 628. Otherwise, the process proceeds to step 630 and determines whether a problem is present in the transmitter. If a problem is identified in step 630, the clock signal is deasserted in step 632. Otherwise, the transmitter determines in step 634 whether the Acknowledge signal is asserted.

When the Acknowledge signal is asserted, a determination is made in step 640 as to whether any data is available for transmission. If data is not available for transmission, the clock signal is kept at a high level in step 642. In step 644, a determination is made as to whether a time equal to four clock cycles has elapsed. When four clock cycles have not elapsed, the process returns to step 634. After four clock cycles have elapsed, the process proceeds to step 626. When data is available for transmission in step 640, the clock signal is asserted in step 652, thereby transmitting a byte on the data lines. Then, a determination is made in step 654 as to whether 16 bytes have been transmitted. When 16 bytes have not been transmitted, the process returns to step 626 for transmission of the next byte in the quad word. When the 16 byte quad word has been transmitted, the process proceeds to step 660 (see FIG. 10B).

When the Acknowledge signal is not asserted, as determined in 634, the data lines are left in the present state in step 636. Then, a determination is made in step 646 as to whether transitions are present on the Acknowledge line. When transitions are present on the Acknowledge line, the process proceeds to step 650 for changing to the receive mode. When transitions are not present on the acknowledge line, as determined in step 646, a determination is made in step 648 as to whether a predetermined timeout period has elapsed. When the timeout period has not elapsed, the process returns to step 634. When the timeout period has elapsed, as determined in step 648, an error interrupt is generated.

Figure 10B:
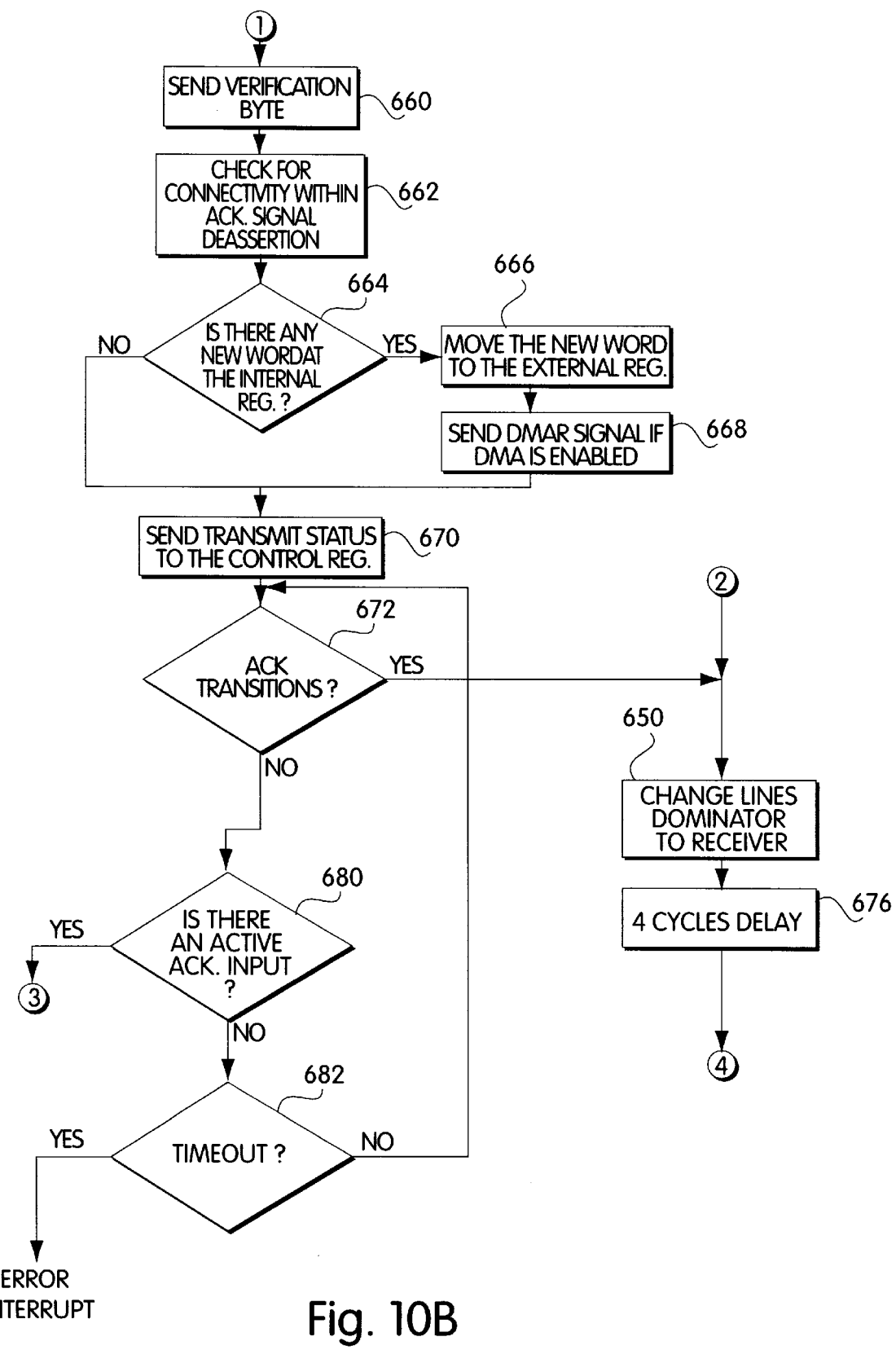

Referring now to FIG. 10B, a verification byte is transmitted in step 660 and connectivity is checked in step 662 by determining whether the Acknowledge signal from the receiver has been deasserted during the transmission of the quad data word. In step 664, a determination is made as to whether a new data word is available in internal register 222 for transmission. When a new data word is present in internal register 222, the new word is moved to the external register 224 in step 666, and the DMA request signal, DMAR, is sent to the DMA controller in step 668 if DMA is enabled. The transmit status is then sent to control register 262 in step 670. In step 672, a determination is made as to whether transitions are present on the Acknowledge line. When transitions are present on the Acknowledge line, the dominator line is changed to indicate the receive mode in step 650, and a four clock cycle delay is initiated in step 676. Following the four clock cycle delay, the process returns to step 620 to wait until the transmitter again becomes active. When transitions are not present on the Acknowledge line, as determined in step 672, a determination is made in step 680 as to whether the Acknowledge signal is asserted. When the Acknowledge signal is asserted, the process returns to step 626 (FIG. 10A). When the Acknowledge signal is not asserted, a determination is made in 682 as to whether a timeout period has elapsed. When the timeout period has not elapsed, the process returns to step 672. When the timeout period has elapsed, as determined in step 682, an error interrupt is generated.

While there have been shown and described what are at present considered the preferred embodiments of the present invention, it will be obvious to those skilled in the art that various changes and modifications may be made therein without departing from the scope of the invention as defined by the appended claims.

What is claimed is:

1. In a digital signal processor, a bidirectional communication port for communication with an external device, said bidirectional communication port comprising:

first transmitting means for transmitting to the external device a first clock on a first control line in a transmit mode and for transmitting to the external device data words on plural data lines in synchronism with said first clock;

first receiving means for receiving from the external device a first acknowledge signal on a second control line in the transmit mode;

second receiving means for receiving a second clock on the second control line in a receive mode and for receiving from the external device data words on said plural data lines in synchronism with said second clock;

second transmitting means for transmitting a second acknowledge signal on said first control line in the receive mode; and switching means for switching between the transmit mode and the receive mode.

2. A bidirectional communication port as defined in claim 1 wherein said first transmitting means includes means for transmitting data words of m bits each, said data words being transmitted on n data lines as a series of m/n nibbles of n bits each, where n is at least 4, and wherein said second receiving means includes means for receiving data words of m bits each on said n data lines as a series of m/n nibbles of n bits each.

3. A bidirectional communication port as defined in claim 2 wherein said data words are received on 8 data lines.

4. A bidirectional communication port as defined in claim 1 wherein said first transmitting means includes means for transmitting data words of m bits each, each of said data words being transmitted on said data lines as a series of m/8 bytes and wherein said second receiving means includes means for receiving data words of m bits each, each of said data words being received on said data lines as a series of m/8 bytes.

5. A bidirectional communication port as defined in claim 4 wherein said first transmitting means includes a transmit buffer for temporary storage of the data words to be transmitted to the external device and wherein said second receiving means includes a receive buffer for temporary storage of the data words received from the external device.

6. A bidirectional communication port as defined in claim 5 wherein said transmit buffer includes means for unpacking the data words for transmission of bytes on said data lines in the transmit mode.

7. A bidirectional communication port as defined in claim 5 wherein said receive buffer includes means for packing bytes of the data words received on said data lines in the receive mode.

8. A bidirectional communication port as defined in claim 4 wherein said first transmitting means includes means for transmitting a verification byte following transmission of a predetermined number of data bytes.

9. A bidirectional communication port as defined in claim 4 wherein said second receiving means includes means for receiving a verification byte following receipt of a predetermined number of data bytes and means for comparing the received verification byte with a calculated verification byte to thereby identify an error condition.

10. A bidirectional communication port as defined in claim 1 wherein said bidirectional communication port utilizes a point-to-point connection of said first and second control lines and said data lines to the external device.

11. A bidirectional communication port as defined in claim 1 wherein said first and second control lines and said data lines comprise a bus for connection of plural devices.

12. A bidirectional communication port as defined in claim 1 wherein said first receiving means includes means for sampling said first acknowledge signal near the end of transmission of a predetermined number of said data words and for transmitting a next data word when said first acknowledge signal is asserted.

13. A bidirectional communication port as defined in claim 1 wherein said switching means includes means for asserting said first clock in the receive mode to thereby generate a transmit request to switch from the receive mode to the transmit mode.

14. A bidirectional communication port as defined in claim 1 wherein said switching means further includes means for counting received data words in the receive mode and wherein said means for asserting said first clock generates said transmit request when a predetermined number of data words have been received.

15. A bidirectional communication port as defined in claim 1 wherein said switching means includes means responsive to assertion of said second clock in the transmit mode for switching from the transmit mode to the receive mode.

16. A bidirectional communication port as defined in claim 1 wherein said first receiving means includes means responsive to a transition in said first acknowledge signal during transmission of a data word for confirming connection of said communication port to the external device.

17. A bidirectional communication port as defined in claim 1 wherein said first receiving means includes means responsive to deassertion of said first acknowledge signal for a timeout period for indicating an error condition.

18. A bidirectional communication port as defined in claim 1 wherein said second receiving means includes means responsive to an unchanging state of the second clock for a predetermined time for indicating an error condition.

19. A bidirectional communication port as defined in claim 1 further comprising means for asserting a third control line indicative of transmission direction.

20. A bidirectional communication port as defined in claim 1 further comprising means for asserting a frame synchronization signal on a third control line.

21. A digital signal processor comprising:
a core processor for performing digital signal computations;
a memory for storing instructions and data values for the digital signal computations;
a memory bus interconnecting said core processor and said memory; and
a bidirectional communication port coupled to said memory bus for communication with an external device, said bidirectional communication port comprising:
first transmitting means for transmitting to the external device a first clock on a first control line in a transmit mode and for transmitting to the external device data words on plural data lines in synchronism with said first clock;
first receiving means for receiving from the external device a first acknowledge signal on a second control line in the transmit mode;
second receiving means for receiving a second clock on the second control line in a receive mode and for receiving from the external device data words on said plural data lines in synchronism with said second clock;
second transmitting means for transmitting a second acknowledge signal on said first control line in the receive mode; and
switching means for switching between the transmit mode and the receive mode.

22. A digital signal processor as defined in claim 21, wherein said first transmitting means includes means for transmitting data words of m bits, each of said data words being transmitted on said data lines as a series of m/8 bytes and wherein said second receiving means includes means for receiving data words of m bits each, each of said data words being received on said data lines as a series of m/8 bytes.

23. A digital signal processor as defined in claim 22, wherein said first transmitting means includes a transmit buffer for temporary storage of the data words to be transmitted to the external device and wherein said second receiving means includes a receive buffer for temporary storage of the data words received from the external device.

24. A digital signal processor as defined in claim 23, wherein said transmit buffer includes means for unpacking the data words for transmission of bytes on said data lines in the transmit mode and wherein said receive buffer includes means for packing bytes of the data words received on said data lines in the receive mode.

25. A digital signal processor as defined in claim 22, wherein said first transmitting means includes means for transmitting a verification byte following transmission of a predetermined number of data bytes.

26. A digital signal processor as defined in claim 22, wherein said second receiving means includes means for receiving a verification byte following receipt of a predetermined number of data bytes and means for comparing the received verification byte with a calculated verification byte to thereby identify an error condition.

27. A digital signal processor as defined in claim 22, wherein said first transmitting means includes means for transmitting a sequence of training bytes for correcting timing skew.

28. A digital signal processor as defined in claim 22, wherein said second receiving means includes means for receiving from the external device a sequence of training bytes, means for varying a timing delay with respect to said training bytes and means for selecting an optimum timing delay for use in receiving said data words.

29. A digital signal processor as defined in claim 21, wherein said first receiving means includes means for sampling said first acknowledge signal near the end of transmission of a predetermined number of said data words and for transmitting the next data word when said first acknowledge signal is asserted.

30. A digital signal processor as defined in claim 21, wherein said switching means includes means for asserting said first clock in the receive mode to thereby generate a transmit request to switch from the receive mode to the transmit mode.

31. A digital signal processor as defined in claim 21, wherein said switching means includes means responsive to assertion of said second clock in the transmit mode for switching from the transmit mode to the receive mode.

32. A digital signal processor as defined in claim 21, wherein said first receiving means includes means responsive to a transition in said first acknowledge signal during transmission of a data word for confirming connection of said communication port to the external device.

33. A digital signal processor as defined in claim 21, wherein said first receiving means includes means responsive to deassertion of said first acknowledge signal for a timeout period for indicating an error condition.

34. A digital signal processor as defined in claim 21, wherein said second receiving means includes means responsive to an unchanging state of the second clock for a predetermined time for indicating an error condition.

35. A digital signal processor as defined in claim 21 wherein said bidirectional communication port further comprises means for asserting a third control line indicative of transmission direction.

36. A digital signal processor as defined in claim 21 wherein said bidirectional communication port further includes means for transmitting a frame synchronization signal on a third control line.

37. A method for bidirectional communication between a digital signal processor and an external device, comprising the steps of:
(a) said digital signal processor transmitting to the external device a first clock on a first control line in a transmit mode and transmitting to the external device data words on plural data lines in synchronism with said first clock;

(b) said digital signal processor receiving from the external device a first acknowledge signal on a second control line in the transmit mode;

(c) said digital signal processor receiving a second clock on the second control line in a receive mode and receiving from the external device data words on said plural data lines in synchronism with said second clock; and (d) said digital signal processor transmitting a second acknowledge signal on said first control line in the receive mode.

* * * * *